(12) United States Patent
Jubert et al.

(10) Patent No.: US 11,276,432 B1
(45) Date of Patent: Mar. 15, 2022

(54) DATA STORAGE DEVICE MEASURING HAMR MEDIA DISTRIBUTIONS

(71) Applicant: Western Digital Technologies, Inc., San Jose, CA (US)

(72) Inventors: Pierre-Olivier Jubert, San Jose, CA (US); Andreas Moser, San Jose, CA (US); Daniel S. Wolf, San Jose, CA (US); Toan Tang, San Jose, CA (US); Thien Nguyen, San Jose, CA (US); Harold H. Gee, San Jose, CA (US)

(73) Assignee: WESTERN DIGITAL TECHNOLOGIES, INC.

( * ) Notice: Subject to any disclaimer, the term of this patent is extended or adjusted under 35 U.S.C. 154(b) by 0 days.

(21) Appl. No.: 17/176,354

(22) Filed: Feb. 16, 2021

(51) Int. Cl.
| | |
|---|---|
| *G11B 27/36* | (2006.01) |
| *G11B 20/18* | (2006.01) |
| *G11B 20/10* | (2006.01) |
| *G11B 5/40* | (2006.01) |
| *G11B 5/02* | (2006.01) |
| *G11B 5/00* | (2006.01) |

(52) U.S. Cl.
CPC .............. *G11B 20/182* (2013.01); *G11B 5/02* (2013.01); *G11B 5/40* (2013.01); *G11B 20/10351* (2013.01); *G11B 2005/0013* (2013.01)

(58) Field of Classification Search
CPC ........... G11B 27/36; G11B 5/09; G11B 20/12; G11B 5/00; G11B 20/18; G11B 2005/0018
USPC .............................................. 360/31, 48, 53
See application file for complete search history.

(56) References Cited

U.S. PATENT DOCUMENTS

| | | | |
|---|---|---|---|
| 6,166,536 A | 12/2000 | Chen et al. | |
| 6,304,081 B1 | 10/2001 | Richter | |
| 6,671,232 B1 | 12/2003 | Stupp | |
| 8,908,483 B1 | 12/2014 | Ren et al. | |
| 9,053,747 B1 * | 6/2015 | Zhang | G11B 20/182 |
| 9,396,750 B2 | 7/2016 | Chu et al. | |
| 9,837,118 B1 | 12/2017 | Mader et al. | |
| 10,043,540 B1 | 8/2018 | Yang | |
| 10,147,454 B1 | 12/2018 | Mendonsa et al. | |

(Continued)

OTHER PUBLICATIONS

T. D. Trinh, S. Rajauria, R. Smith, E. Schreck, Q. Dai and F. E. Talke, "Temperature-Induced Near-Field Transducer Failure in Heat-Assisted Magnetic Recording," in IEEE Transactions on Magnetics, vol. 56, No. 6, pp. 1-4, Jun. 2020.

(Continued)

*Primary Examiner* — Nabil Z Hindi
(74) *Attorney, Agent, or Firm* — Patterson & Sheridan, LLP; Steven H. Versteeg

(57) ABSTRACT

A data storage device is disclosed comprising a head actuated over a magnetic media, wherein the head comprises a write coil, a laser configured to heat the magnetic media during a write operation, and a read element. A test pattern is written to the magnetic media by applying a current to the write coil and a first bias to the laser. A second bias is applied to the laser while the head passes over the test pattern, and then the test pattern is read from the magnetic media using the head to generate a first read signal. A first noise power of the first read signal is measured, and at least one parameter of a noise power function is generated based on the first noise power measurement, wherein the noise power function is a function of at least the bias applied to the laser.

21 Claims, 4 Drawing Sheets

(56) References Cited

U.S. PATENT DOCUMENTS

| | | |
|---|---|---|
| 10,339,963 B1 | 7/2019 | Mader et al. |
| 10,446,182 B1 | 10/2019 | Zhang et al. |
| 10,699,736 B1 | 6/2020 | Rajauria et al. |

OTHER PUBLICATIONS

I. Gilbert, D. A. Saunders, P. Czoschke, Z. Liu, S. Granz and T. Rausch, "Measuring Cross-Track Thermal Gradient in Heat-Assisted Magnetic Recording," in IEEE Transactions on Magnetics, vol. 55, No. 12, pp. 1-5, Dec. 2019.

Shaomin Xiong, Robert Smith, Jian Xu, Shuji Nishida, Masaru Furukawa, Kenji Tasaka, Kenji Kuroki, Yeoungchin Yoon, Na Wang, Sripathi Canchi, Erhard Schreck, and Qing Dai, "Setting Write Spacing in Heat Assisted Magnetic Recording," in IEEE Transactions on Magnetics, vol. 54, No. 8, pp. 1-7, Aug. 2018.

I. Gilbert, Z. Liu, X. Zheng, S. Granz, W. Eppler and T. Rausch, "Measuring Thermal Gradient in HAMR Using Pseudorandom Bit Sequences," in IEEE Transactions on Magnetics, vol. 55, No. 3, pp. 1-6, Mar. 2019.

H. J. Richter, C. C. Poon, G. Parker, M. Staffaroni, O. Mosendz, R. Zakai, and B. C. Stipe, "Direct Measurement of the Thermal Gradient in Heat Assisted Magnetic Recording," in IEEE Transactions on Magnetics, vol. 49, No. 10, pp. 5378-5381, Oct. 2013.

Hai Li, "Storage Physics and Noise Mechanism in Heat-Assisted Magnetic Recording," Carnegie Mellon University. Thesis. Sep. 2016. https://doi.org/10.1184/R1/6723209.v1.

M. J. Vos, Y. Tanaka and J. H. Judy, "Measurements and modelling of noise in DC-erased thin-film media," in IEEE Transactions on Magnetics, vol. 26, No. 5, pp. 2149-2151, Sep. 1990.

G. J. Tarnopolsky, L. T. Tran, A. M. Barany, H. N. Bertram and D. R. Bloomquist, "DC modulation noise and demagnetizing fields in thin metallic media," in IEEE Transactions on Magnetics, vol. 25, No. 4, pp. 3160-3165, Jul. 1989.

\* cited by examiner

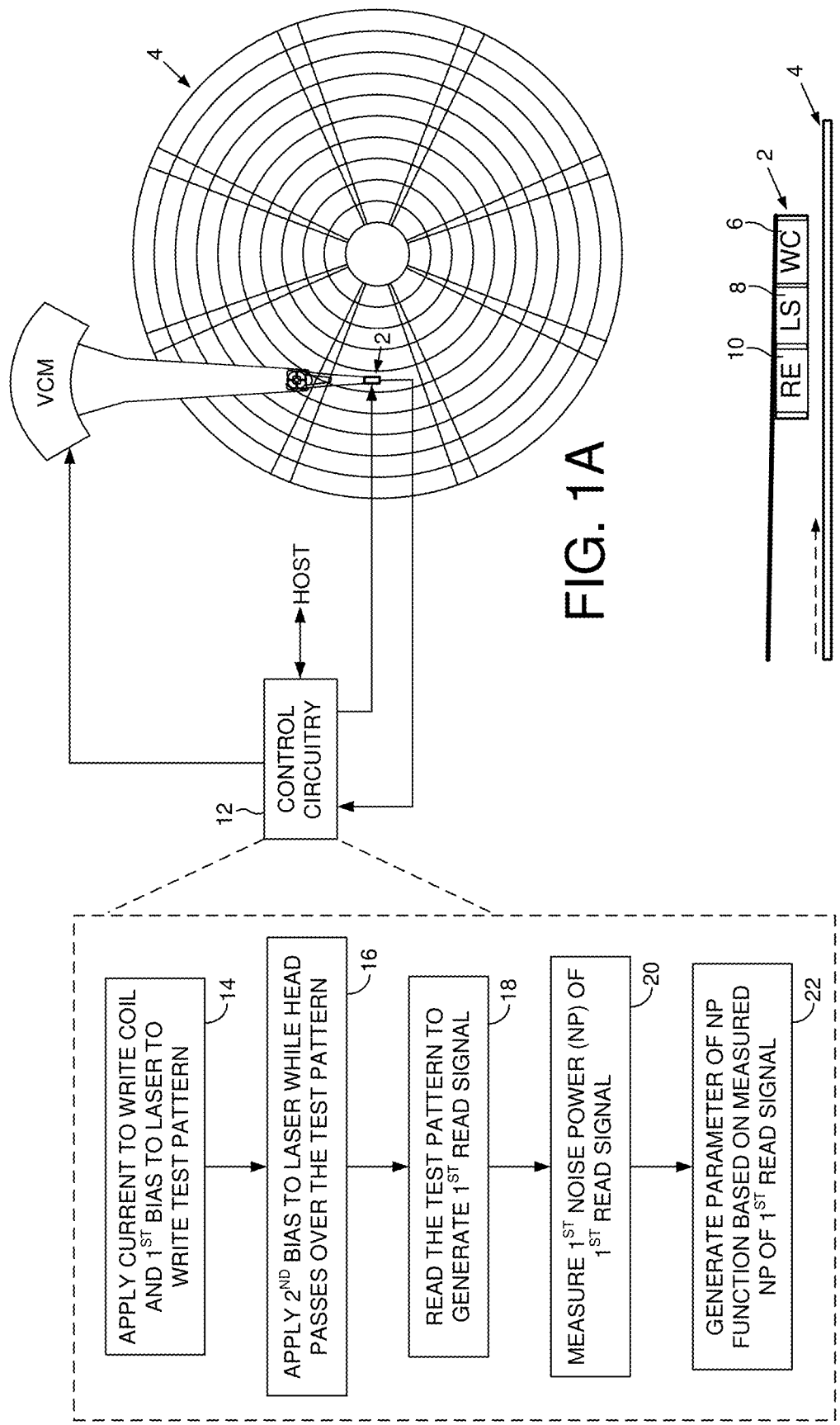

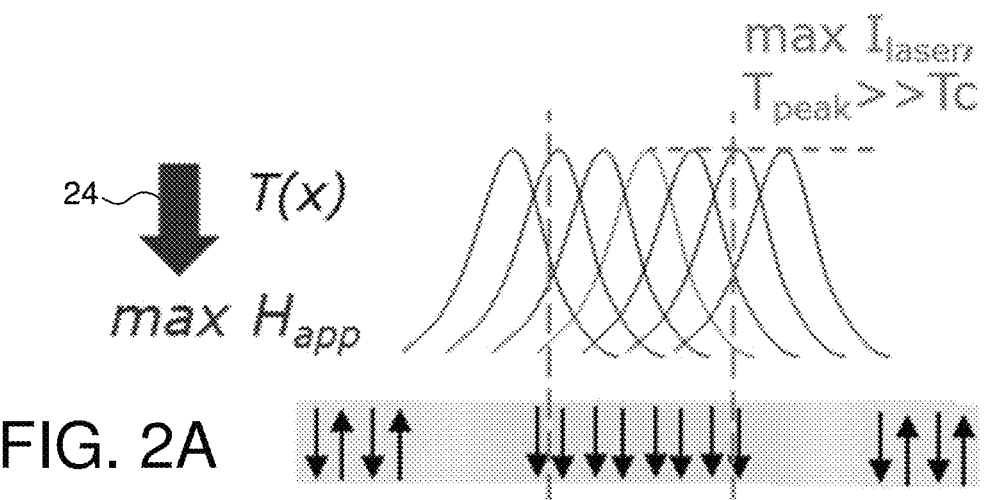
FIG. 2A
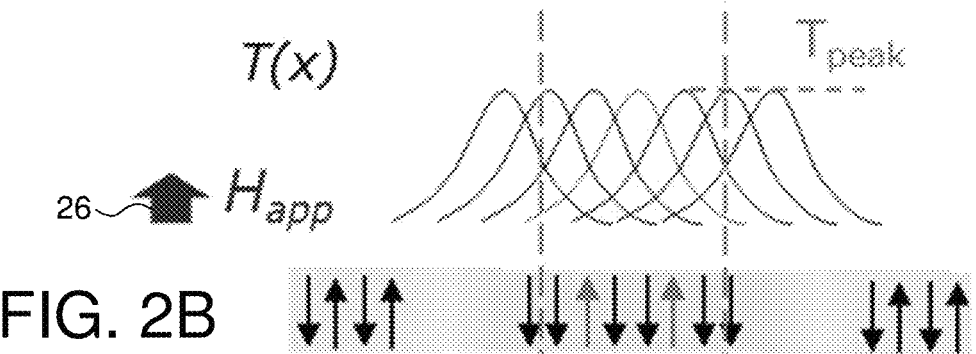
FIG. 2B
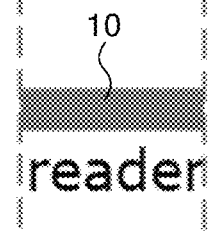

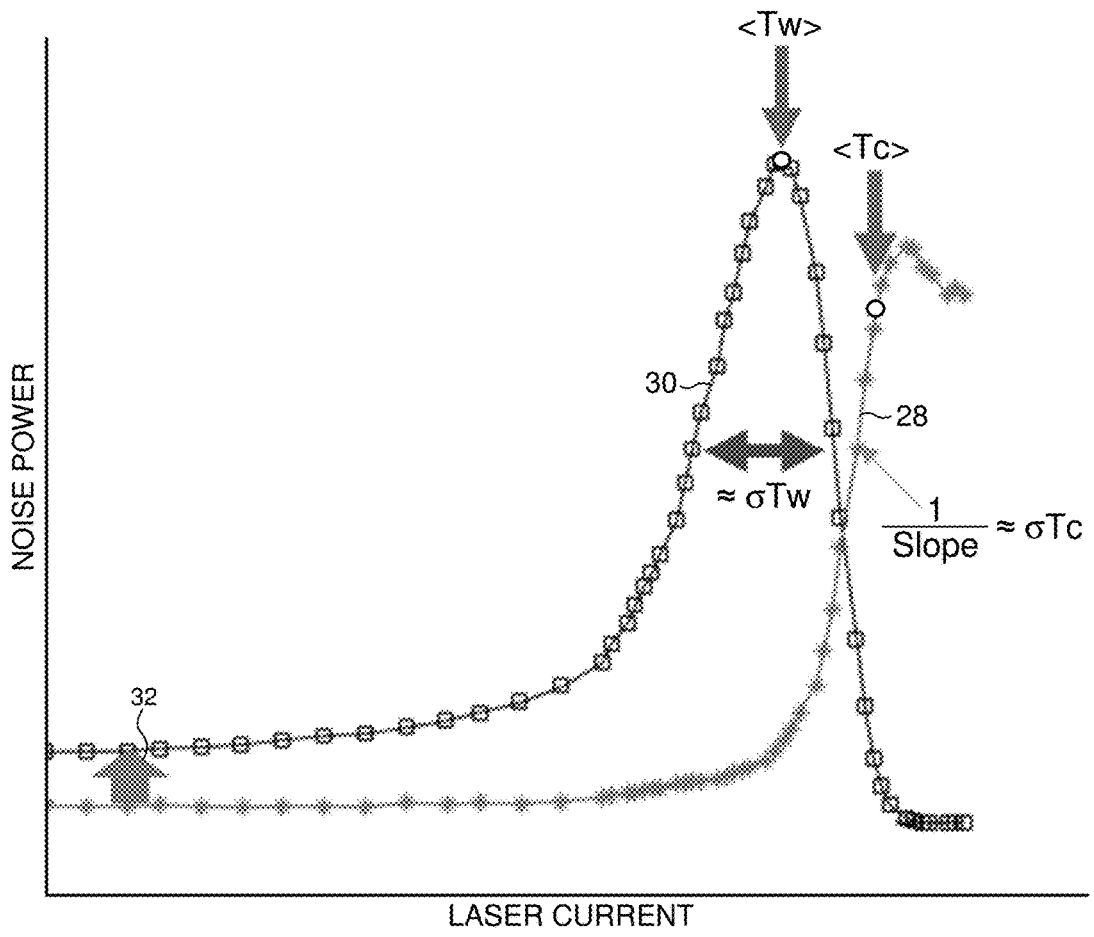

FIG. 3A $$NP = 4 \cdot \{\alpha \cdot 0.5 \cdot [erf(I_{laserTc}, I_{laser\sigma Tc}/sqrt(2))+1]\} \cdot (1-\{\alpha \cdot 0.5 \cdot [erf(I_{laserTc}, I_{laser\sigma Tc}/sqrt(2))+1]\})$$

FIG. 3B $$T_{peak}(I_{laser}) = T_{amb} + (<Tc> - T_{amb}) \cdot (I_{laser} - I_{laserThreshold})/(I_{laserTc} - I_{laserThreshold})$$

FIG. 3C $$\sigma Tc / Tc = I_{laser\sigma Tc} \cdot (<Tc> - T_{amb})/(I_{laserTc} - I_{laserThreshold})/<Tc>$$

FIG. 3D $$dT/dy = 4 \cdot (T_{peak}(I_{laserOpti}) - T_{amb})/MWW \cdot \log((T_{peak}(I_{laserOpti}) - T_{amb})/(<Tw> - T_{amb}))$$

FIG. 3E

DATA STORAGE DEVICE MEASURING HAMR MEDIA DISTRIBUTIONS

CROSS REFERENCE TO RELATED APPLICATIONS

This application is related to co-pending U.S. patent application Ser. No. 17/176,302 entitled "DATA STORAGE DEVICE DETECTING WRITE POLE DEGRADATION FOR MAGNETIC WRITE HEAD" and U.S. patent application Ser. No. 17/176,282 entitled "DATA STORAGE DEVICE PREDICTING FAILURE OF NEAR FIELD TRANSDUCER BASED ON SLOPE OF THERMAL GRADIENT," which are hereby incorporated by reference in their entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Data is typically written to the disk by modulating a write current in an inductive coil (write coil) to record magnetic transitions onto the disk surface in a process referred to as saturation recording. During read-back, the magnetic transitions are sensed by a read element (e.g., a magneto-resistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head.

BRIEF DESCRIPTION OF THE DRAWINGS

FIG. 1A shows a data storage device in the form of a disk drive comprising a head actuated over a magnetic media.

FIG. 1B shows an embodiment wherein the head comprises a write coil, a laser configured to heat the magnetic media during write operations, and a read element.

FIG. 1C is a flow diagram according to an embodiment wherein a parameter of a noise power function is generated based on a noise power measurement of a read signal when reading a test pattern from the magnetic media.

FIG. 2A shows an embodiment wherein a test pattern is written to the magnetic media using a high bias applied to the laser and a high current applied to the write coil.

FIG. 2B shows an embodiment wherein the test pattern is read after applying a second bias to the laser while the head passes over the test pattern, wherein a noise power of the resulting read signal is measured.

FIG. 3A shows a plot of noise power of the read signal versus a bias current applied to a laser when the current applied to the write coil is approximately zero, and when the current applied to the write coil is a calibrated current that achieves a target capacity of the magnetic media.

FIG. 3B shows a noise power function of at least the bias current applied to the laser according to an embodiment, wherein at least one parameter of the noise power function is generated based on the noise power measurements.

FIG. 3C shows a function for estimating a peak temperature of the magnetic media for a given bias applied to the laser according to an embodiment.

FIG. 3D shows a function for estimating a standard deviation of a Currie temperature of the magnetic media.

FIG. 3E shows a function for estimating a thermal gradient of the magnetic media when applying a calibrated bias to the laser.

DETAILED DESCRIPTION

Figure 4:
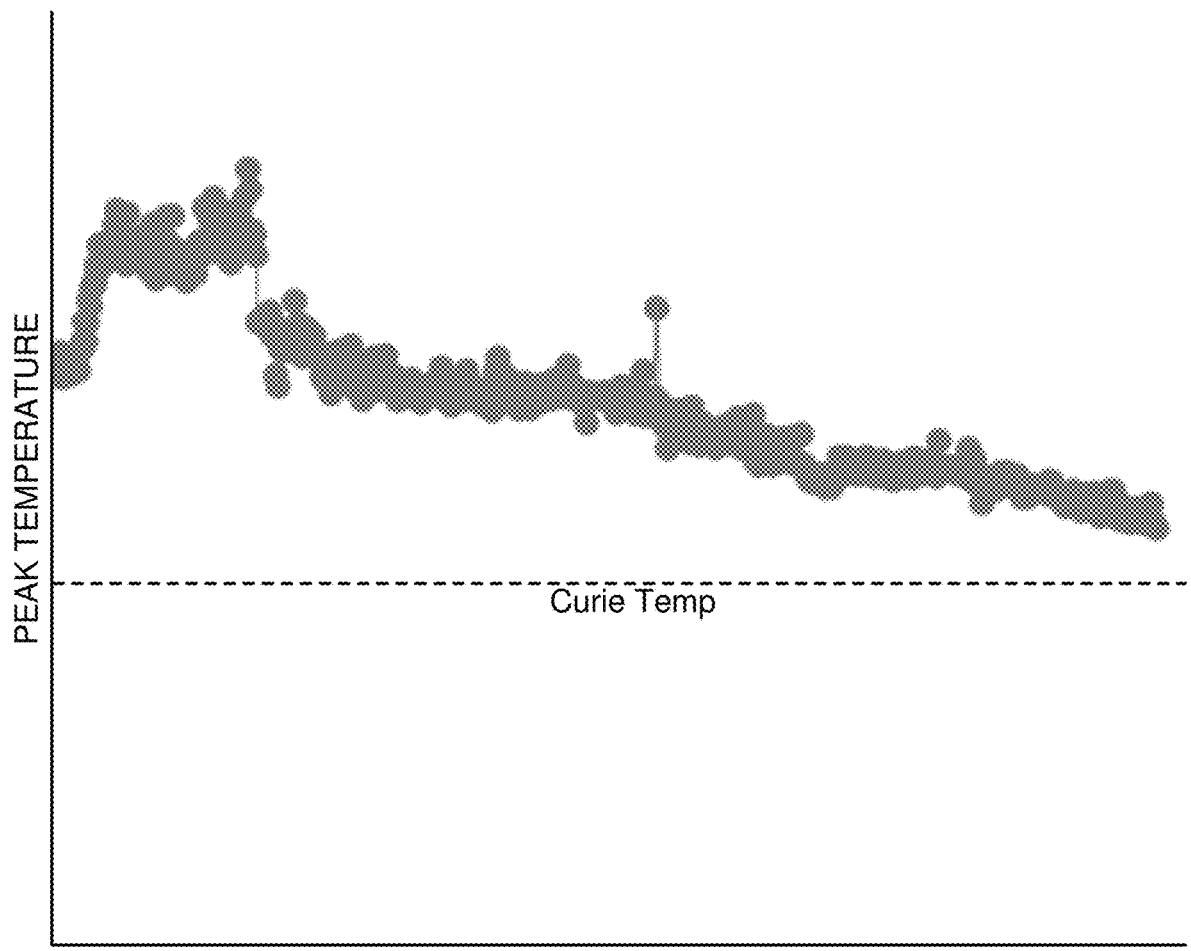
FIG. 4 shows a peak temperature of the magnetic media changing over time when applying a calibrated bias to the laser, wherein in one embodiment change of the peak temperature may indicate failure of the NFT.

FIG. 1A shows a data storage device in the form of a disk drive according to an embodiment comprising a head 2 actuated over a magnetic media such as a disk 4, wherein in one embodiment shown in FIG. 1B, the head 2 comprises a write coil 6, a laser 8 configured to heat the magnetic media during a write operation, and a read element 10. While a disk drive is used as an illustrative example herein, various embodiments of the invention may be applied to, and/or include, other types of data storage device with magnetic media such as tape drives. The disk drive further comprises control circuitry 12 configured to execute the flow diagram of FIG. 1C, wherein a test pattern is written to the magnetic media by applying a current to the write coil and a first bias to the laser (block 14). A second bias is applied to the laser while the head passes over the test pattern (block 16), and thereafter the test pattern is read from the magnetic media using the head to generate a first read signal (block 18). A first noise power of the first read signal is measured (block 20), and at least one parameter of a noise power function is generated based on the first noise power measurement (block 22), wherein the noise power function is a function of at least the bias applied to the laser.

In one embodiment, the areal density and corresponding capacity of the magnetic media may depend on the sharpness of the magnetic transitions recorded on the magnetic media. The fabrication process as well as the magnetic properties of the materials that make up HAMR media can affect the Curie temperature distribution as well as the magnetic anisotropy and coercivity distributions which are primary factors that determine the sharpness of the magnetic transitions. Accordingly in one embodiment, certain magnetic media property distributions (e.g., the standard deviation of the Curie temperature) are estimated using the control circuitry internal to the data storage device by estimating a noise power function representing a probability the grains of the magnetic media will switch their magnetization when subjected to a range of temperatures via the laser 8 and a range of magnetic fields via the write coil 6. In one embodiment, parameters of the noise power function may also be used to estimate other properties of the magnetic media, such as a peak temperature of the magnetic media for a given laser bias, a thermal gradient of the magnetic media for a calibrated laser bias, the mean and standard deviation write temperature of the magnet media for a given write current, the write current required to saturate the magnetic media at a high recording temperature (high laser bias)

significantly above the mean Curie temperature of the magnetic media, and the proportion of the magnetic media grains that switch their magnetization for a given write current at room temperature (low laser bias that heats the magnetic media below the mean Curie temperature of the magnetic media).

In one embodiment, the statistics of the magnetic grain orientation of the magnetic media follows a binomial distribution with parameters n and p, where n represents a number of grains for a given area of the magnetic media, p represents the proportion of grains being in a first orientation (e.g., up in perpendicular recording), and (1-p) being the proportions of grains being in a second orientation (e.g., down in perpendicular recording). The mean signal seen by the read element 10 may be represented as:

$$n \cdot (p-(1-p))$$

and the variance of the signal may be represented as:

$$n \cdot 4 \cdot p \cdot (1-p).$$

When the grains of the magnetic media are initialized into a predetermined orientation (e.g., all down in perpendicular recording), then p=0 and (1-p)=1. When the grains are then subject to a given temperature (via the laser) and a given magnetic field (via the write coil) having a magnetic orientation opposite of the grains, a proportion P of the grains will align to the applied magnetic field. The noise power of the read signal when reading the magnetic media may be represented as:

$$4 \cdot P \cdot (1-P).$$

In one embodiment assuming the grains have a Gaussian distribution of write or switching temperature values, a noise power function of the read signal (function of the bias applied to the laser) may be represented by the equation shown in FIG. 3B where erf represents an error function, $I_{laserTc}$ represents a bias applied to the laser that causes the magnetic media to reach a mean Curie temperature (which may be measured using any suitable technique), and $I_{laser\sigma Tc}$ represents a standard deviation of the bias applied to the laser that causes the magnetic media to reach the Curie temperature. The parameter α represents the probability of a grain aligning to the applied magnetic field. When the magnetic field applied to the magnetic media is approximately zero (i.e., approximately zero write current), the probability of a grain switching magnetization is ideally α=0.5. Accordingly in one embodiment shown in FIG. 2A, a test pattern may be written to the magnetic media using a high temperature (high bias applied to the laser) in order to heat the magnetic media significantly above its mean Curie temperature and a high magnetic field 24 (high current applied to the write coil) in order to initialize the grains of the magnetic media into a predetermined orientation (e.g., all down in the example of FIG. 2A). The test pattern is then subjected to a lower temperature (via a lower bias applied to the laser) and a lower magnetic field 26 having a magnetic orientation opposite of the grains as shown in FIG. 2B (i.e., an overwrite operation). The read element 10 is then used to read the test pattern, and a noise power of the resulting read signal is measured.

In the embodiment shown in FIG. 2A, the test pattern is "band written" by rewriting the test pattern at a number of radial offsets in order to subject a predetermined band of the magnetic media to the peak media temperature induced by the laser. Similarly in the embodiment of FIG. 2B, the overwrite operation is executed at a number of radial offsets in order to subject the predetermined band of the magnetic media to the peak media temperature induced by the laser. Any suitable test pattern may be written to the magnetic media, such as a DC pattern or an AC pattern, as long as the initial saturated state of the magnetic media is known prior to the overwrite operation.

In one embodiment, the noise power measurement of the read signal may be made by writing the test pattern as shown in FIG. 2A so that the grains have a first magnetic orientation (e.g., all down) prior to the overwrite operation. The noise power measurement of the read signal may also be made by writing the test pattern so that the grains have a second orientation (e.g., all up) prior to the overwrite operation. The two noise power measurements may then be averaged in order to improve the accuracy of the final measurement.

In one embodiment, when the magnetic field 26 during the overwrite operation of FIG. 2B is approximately zero (i.e., when the current applied to the write coil is approximately zero), the resulting noise power measurement of the read signal is affected primarily by the Curie temperature properties of the magnetic media. Accordingly in one embodiment shown in FIG. 3A, the bias applied to the laser (laser current in this example) is swept through a range of settings from low to high over a number of corresponding overwrite operations. For each setting of the laser current the overwrite operation of FIG. 2B is executed, and after the overwrite operation the test pattern is read and the noise power of the read signal measured as represented by curve 28 in FIG. 3A. At least one parameter of the noise power function shown in FIG. 3B may then be generated by curve fitting the noise power measurements of curve 28 to the noise power function of FIG. 3B. For example, the laser current $I_{laserTc}$ corresponding to the mean Curie temperature <Tc> of the grains of the magnetic media shown in FIG. 3B as well as the standard deviation of the laser current $I_{laser\sigma Tc}$ that causes the grains to reach their Curie temperature may be estimated by curve fitting the noise power measurements of curve 28 in FIG. 3A to the noise power function of FIG. 3B. In one embodiment the switching probability parameter α in the noise power function of FIG. 3B may be generated by curve fitting the noise power measurements of curve 28, and in another embodiment, it may be assumed the switching probability parameter α is near the ideal value of 0.5 since the magnetic field 26 during the overwrite operation is approximately zero.

In one embodiment, the grains of the magnetic media may be re-initialized such as shown in FIG. 2A prior to each overwrite operation (for each different laser current setting shown in FIG. 3A). In another embodiment, the process of generating the noise power measurements shown in FIG. 3A may be expedited by performing each overwrite operation without re-initializing the grains of the magnetic media (i.e., in one embodiment the grains may be initialized one time such as shown in FIG. 2A prior to executing a number of the overwrite operations each at an incrementally higher laser current).

Having generated at least one parameter of the noise power function shown in FIG. 3B by curve fitting the noise power curve 28 of FIG. 3A, in one embodiment a number of other properties of the magnetic media may be measured. For example, having generated the parameters $I_{laserTc}$ and $I_{laser\sigma Tc}$ as described above, the peak temperature that the magnetic media is subjected to for any given laser current $I_{laser}$ may be estimated based on the function shown in FIG. 3C (where $T_{amb}$ represents the ambient temperature and $I_{laserThreshold}$ represents the lasing threshold of the laser). In one embodiment, the laser current may be calibrated over time by executing a calibration procedure (during manufacturing of the data storage device and/or while the data storage device is deployed in the field) in order to maintain a target magnetic write width (MWW) of the head, and thereby maintain a corresponding target capacity for the magnetic media. In one embodiment, the peak temperature seen by the magnetic media may be estimated over time using the function of FIG. 3C as the calibrated laser current changes over time as shown in FIG. 4. In one embodiment, a change in the peak temperature over time such as shown in FIG. 4 may be used to predict failure of the NFT. For example, when the peak temperature falls below a threshold, or when the rate of change (slope) of the peak temperature rises above a threshold, it may indicate the NFT is failing.

FIG. 3D shows a function for estimating the standard deviation $\sigma Tc$ of the grain Curie temperatures based on the parameters generated for the noise power function of FIG. 3B as described above. The standard deviation $\sigma Tc$ of the grain Curie temperatures may be used for any suitable reason, wherein in one embodiment the standard deviation may be used as a quality metric for evaluating the quality of the magnetic media. For example in one embodiment, a higher quality magnetic media will have a smaller standard deviation of the grain Curie temperatures.

FIG. 3A shows an embodiment wherein a noise power curve 30 may be generated for a given non-zero magnetic field 26 (i.e., write current) applied to the magnetic media during the overwrite operation (e.g., as shown in FIG. 2B). That is, in one embodiment the laser current is adjusted incrementally for each overwrite operation while also applying a given non-zero magnetic field 26. Based on the resulting noise power curve 30 the average write temperature <Tw> may be estimated as well as the standard deviation $\sigma Tw$ of the write temperature (which may be obtained from fitting the noise power curve 30 with the noise power equation shown in FIG. 3B after replacing "Tc" with "Tw," or which may be approximated as the peak and the width of the distribution as shown in FIG. 3A). Similar to the standard deviation $\sigma Tc$ of the grain Curie temperatures, the parameters of the noise power curve 30 for a given non-zero write current may be used for any suitable reason, such as to evaluate the quality of the magnetic media. In one embodiment, the difference 32 in the noise power curve 28 and the noise power curve 30 at room temperature (low laser current) may be measured and used for any suitable reason. For example, in one embodiment the noise power may be measured at room temperature for zero write current (curve 28) and for a calibrated operating write current (curve 30), wherein when the difference 32 is lower than a threshold (or a slope of the difference exceeds a threshold), it may indicate a write pole of the head is failing.

FIG. 3E shows a function for estimating a thermal gradient of the magnetic media based on the parameters generated for the noise power function of FIG. 3B as described above. In this embodiment, the write current applied to the write coil and the laser current applied to the laser are calibrated to optimal settings that achieve a target magnetic write width (MWW) and corresponding capacity of the magnetic media. The peak temperature of the media is generated for the calibrated laser current $I_{laserOpti}$ using the function of FIG. 3C, and the mean write temperature <Tw> for the calibrated write current is estimated by generating the noise power curve 30 shown in FIG. 3A. The thermal gradient generated using the function of FIG. 3E may be used for any suitable reason, such as to evaluate the quality of the NFT and/or to predict failure of the NFT when a change in the thermal gradient (or a rate of change) exceeds a threshold.

Any suitable conventional technique may be employed to measure the noise power of the read signal in the above described embodiments. For example, techniques for measuring the noise power of a read signal are disclosed in the technical articles "MEASUREMENTS AND MODELING OF NOISE IN DC-ERASED THIN-FILM MEDIA" by Martin J. Vos, et al., and "DC MODULATION NOISE AND DEMAGNETIZING FIELDS IN THINK METALLIC MEDIA" by Giora J. Tarnopolsky et al., the disclosures of which are incorporated herein by reference.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a magnetic media;
   a head actuated over the magnetic media, wherein the head comprises a write coil, a laser configured to heat the magnetic media during a write operation, and a read element; and
   control circuitry configured to:
      write a test pattern to the magnetic media by applying a current to the write coil and a first bias to the laser;
      apply a second bias to the laser while the head passes over the test pattern;
      after applying the second bias to the laser while the head passes over the test pattern, read the test pattern from the magnetic media using the head to generate a first read signal;
      measure a first noise power of the first read signal; and
      generate at least one parameter of a noise power function based on the first noise power measurement, wherein the noise power function is a function of at least the bias applied to the laser.

2. The data storage device as recited in claim 1, wherein the control circuitry is further configured to:
   apply a third bias to the laser while the head passes over the test pattern;
   after applying the third bias to the laser while the head passes over the test pattern, read the test pattern from the magnetic media using the head to generate a second read signal;
   measure a second noise power of the second read signal; and
   generate at least one parameter of the noise power function based on the first and second noise power measurements.

3. The data storage device as recited in claim 2, wherein the control circuitry is further configured to apply approximately zero current to the write coil while applying the second bias to the laser and while applying the third bias to the laser.

4. The data storage device as recited in claim 2, wherein the noise power function is:

$$4 \cdot \{\alpha \cdot 0.5[\text{erf}(I_{laserTc}, I_{laser\sigma Tc}/\text{sqrt}(2))+1]\} \cdot (1 - \{\alpha \cdot 0.5 \cdot [\text{erf}(I_{laserTc}, I_{laser\sigma Tc}/\text{sqrt}(2))+1]\})$$

where:
   erf represents an error function;
   $\alpha$ represents a probability of switching a magnetization in the test pattern;
   $I_{laserTc}$ represents a bias applied to the laser that causes the magnetic media to reach a mean Curie temperature; and
   $I_{laser\sigma Tc}$ represents a standard deviation of the bias applied to the laser that causes the magnetic media to reach the Curie temperature.

5. The data storage device as recited in claim 4, wherein the at least one parameter of the noise power function generated by the control circuitry comprises at least one of the $\alpha$, $I_{laserTc}$, or $I_{laser\sigma Tc}$ parameters.

6. The data storage device as recited in claim 4, wherein the control circuitry is further configured to estimate a peak temperature of the magnetic media for a given bias applied to the laser based on the $I_{laserTc}$ parameter.

7. The data storage device as recited in claim 6, wherein the control circuitry is further configured to estimate a thermal gradient for the magnetic media based on the estimated peak temperature of the magnetic media for a given bias applied to the laser.

8. The data storage device as recited in claim 6, wherein the head further comprises a near field transducer (NFT) and the control circuitry is further configured to predict a failure of the NFT based on the estimated peak temperature.

9. The data storage device as recited in claim 4, wherein the control circuitry is further configured to estimate a distribution of the Curie temperature for the magnetic media based on the $I_{laser\sigma Tc}$ parameter.

10. A data storage device comprising:
    a magnetic media;
    a head actuated over the magnetic media, wherein the head comprises a write coil, a laser configured to heat the magnetic media during a write operation, and a read element; and
    control circuitry configured to:
       write a test pattern to the magnetic media by applying a first current to the write coil and a first bias to the laser;
       apply a second current to the write coil and apply a second bias to the laser while the head passes over the test pattern;
       after applying the second current to the write coil and applying the second bias to the laser while the head passes over the test pattern, read the test pattern from the magnetic media using the head to generate a first read signal; and
       measure a first noise power of the first read signal.

11. The data storage device as recited in claim 10, wherein the control circuitry is further configured to:
    apply the second current to the write coil and apply a third bias to the laser while the head passes over the test pattern;
    after applying the second current to the write coil and applying the second bias to the laser while the head passes over the test pattern, read the test pattern from the magnetic media using the head to generate a second read signal; and
    measure a second noise power of the second read signal.

12. The data storage device as recited in claim 10, wherein the first current applied to the write coil has a polarity opposite the second current applied to the write coil.

13. The data storage device as recited in claim 10, wherein the control circuitry is further configured to calibrate the second write current to achieve a target capacity of the magnetic media.

14. The data storage device as recited in claim 11, wherein the control circuitry is further configured to estimate a mean temperature of the magnetic media for a plurality of biases applied to the laser based on the first and second noise power measurements.

15. The data storage device as recited in claim 11, wherein the control circuitry is further configured to estimate a standard deviation of temperatures of the magnetic media for a plurality of biases applied to the laser based on the first and second noise power measurements.

16. The data storage device as recited in claim 11, wherein the control circuitry is further configured to estimate a write current applied to the coil required to saturate the magnetic media when a relatively high bias is applied to the laser in order to heat the magnetic media above a mean Curie temperature of the magnetic media.

17. The data storage device as recited in claim 11, wherein the control circuitry is further configured to estimate a proportion of grains of the magnetic media that switch their magnetization for a given current applied to the write coil when a relatively low bias is applied to the laser in order to heat the magnetic media below a mean Curie temperature of the magnetic media.

18. The data storage device as recited in claim 11, wherein the control circuitry is further configured to estimate a peak temperature of the magnetic media for a given bias applied to the laser based on the first and second noise power measurements.

19. The data storage device as recited in claim 18, wherein the control circuitry is further configured to estimate a thermal gradient for the magnetic media based on the estimated peak temperature of the magnetic media.

20. The data storage device as recited in claim 18, wherein the head further comprises a near field transducer (NFT) and the control circuitry is further configured to predict a failure of the NFT based on the estimated peak temperature.

21. A data storage device comprising:

a magnetic media;

a head actuated over the magnetic media, wherein the head comprises a write coil, a laser configured to heat the magnetic media during a write operation, and a read element;

a means for applying a current to the write coil and applying a first bias to the laser while the head passes over a test pattern;

after applying the current to the write coil and applying the first bias to the laser while the head passes over the test pattern, a means for reading the test pattern from the magnetic media using the head to generate a first read signal;

a means for measuring a first noise power of the first read signal;

a means for applying the current to the write coil and applying a second bias to the laser while the head passes over the test pattern;

after applying the second current to the write coil and applying the second bias to the laser while the head passes over the test pattern, a means for reading the test pattern from the magnetic media using the head to generate a second read signal; and a means for measuring a second noise power of the second read signal.

\* \* \* \* \*